(12) United States Patent
Nakayama et al.

(10) Patent No.: US 6,719,602 B2
(45) Date of Patent: Apr. 13, 2004

(54) NANOTUBE LENGTH CONTROL METHOD

(75) Inventors: Yoshikazu Nakayama, 9-404, 14-2, Korigaoka 1-chome, Hirakata-shi, Osaka 573-0084 (JP); Seiji Akita, Izumi (JP); Akio Harada, Osaka (JP)

(73) Assignees: Yoshikazu Nakayama, Osaka (JP); Daiken Chemical Co., Ltd., Osaka (JP)

( * ) Notice: Subject to any disclaimer, the term of this patent is extended or adjusted under 35 U.S.C. 154(b) by 60 days.

(21) Appl. No.: 10/155,056

(22) Filed: May 24, 2002

(65) Prior Publication Data

US 2003/0010755 A1 Jan. 16, 2003

(30) Foreign Application Priority Data

May 28, 2001 (JP) .......................................... 2001-159208

(51) Int. Cl.[7] ................................................. H01J 9/02

(52) U.S. Cl. ....................................... 445/50; 219/69.17

(58) Field of Search ............ 445/50, 46; 219/69.1–69.2

(56) References Cited

U.S. PATENT DOCUMENTS

| 2,759,088 | A | * | 8/1956 | Lincoln ................... 219/69.17 |
| 5,178,742 | A | * | 1/1993 | Lemke et al. ............ 219/69.18 |
| 6,159,742 | A | * | 12/2000 | Lieber et al. ................ 436/164 |
| 6,228,498 | B1 | * | 5/2001 | Yokogawa et al. ......... 428/408 |
| 6,283,812 | B1 | * | 9/2001 | Jin et al. ....................... 445/24 |
| 6,452,171 | B1 | * | 9/2002 | Moloni ....................... 250/307 |
| 6,519,221 | B1 | * | 2/2003 | Manalis et al. ............. 369/126 |
| 6,528,785 | B1 | * | 3/2003 | Nakayama et al. ......... 250/306 |

* cited by examiner

*Primary Examiner*—Kenneth J. Ramsey
(74) *Attorney, Agent, or Firm*—Koda & Androlia

(57) ABSTRACT

A nanotube length control method involving a nanotube and a discharge needle so that the nanotube with its base end portion fastened to a holder and its tip end portion caused to protrude is set so as for its tip end to face the tip end of the discharge needle. A voltage is applied across the nanotube and the discharge needle so that an electrical discharge is caused to occur between the tip end of the nanotube and the tip end of the discharge needle, thus cutting down the tip end of the nanotube by this discharge, and it is possible to control the length of the tip end portion of the nanotube.

4 Claims, 2 Drawing Sheets

NANOTUBE LENGTH CONTROL METHOD

BACKGROUND OF THE INVENTION

1. Field of the Invention

The present invention relates to a method for adjusting the length of a nanotube and more particularly to a nanotube length control method in which the length of a nanotube is controlled by disposing the nanotube in a state in which the tip end of the nanotube protrudes and cutting down the tip end of the nanotube by means of an electrical discharge.

2. Prior Art

Carbon nanotubes are typical examples of nanotubes.

Conventionally, carbon nanotubes have been manufactured by the arc discharge method and the vapor-phase growth method. However, carbon nanotubes manufactured by these methods have a wide distribution of diameters and lengths.

Meanwhile, the inventors of the present application have noted that carbon nanotubes have a high aspect ratio (length/diameter), superior flexibility and a high strength. As a result, the inventors envisioned a broad range of applications of such nanotubes as manipulating means in the nano-scale region. Such applications include, for instance, the use of carbon nanotubes as AFM (atomic force microscope) probe needles and the use of carbon nanotubes as input-output probe heads of magnetic devices. Consequently, the inventors proposed numerous devices that use such carbon nanotubes.

Nanotubes thus can be used as nano-scale manipulating means in a wide range of applications. In order to develop this theme in more concrete terms, a description will be made below for a nanotube used as an AFM probe needle as an example.

Generally, a cantilever made of a semiconductor which has a sharp protruding portion at the tip end is used as an AFM probe needle. The inventors of the present application developed a technique in which the base end portion of a carbon nanotube is firmly fastened to the protruding portion of such a cantilever by means of a coating film and/or thermal fusion. In recent years, techniques that allow a carbon nanotube to grow on a holder such as a cantilever by a CVD process (chemical vapor deposition process) have also been developed.

Such a nanotube probe is characterized in that it has superior physical properties of carbon nanotubes. In other words, the nanotube probe has high durability and shows almost no breakage even if the tip end portion of the carbon nanotube is used as a probe needle that scans the surface of a substance. Furthermore, since carbon nanotubes have a high aspect ratio with a diameter ranging from several nanometers to several tens of nanometers and a length ranging from a nanometer to micron range, an AFM probe needle with an extremely high resolution can be realized.

However, such nanotube probes have some weak points. In the case of an arc discharge method or vapor-phase growth method, as described above, the lengths and diameters of the carbon nanotubes that are manufactured have a wide distribution, and no manufacturing method that produces carbon nanotubes with a uniform diameter and length has yet been realized.

Thus, when a carbon nanotube is fastened to or grown on the protruding portion of a cantilever, the length of the tip end portion of the carbon nanotube that protrudes forward from the protruding portion of the cantilever tend unavoidably to be non-uniform. In cases where the length of the tip end portion of the carbon nanotube is not uniform, the performance of the nanotube probe varies, resulting in that a stable, uniform probe needle performance cannot be obtained.

For example, in cases where the length of the tip end portion of the nanotube is long, this tip end portion tends to undergo self-excited vibration. When the tip end portion vibrates, the tip end cannot detect information regarding various points on the sample surface with good precision when the sample surface is scanned. As a result, the resolution drops abruptly. In order to suppress self-excited vibration of the nanotube, it is necessary to shorten the length of the tip end portion of the nanotube to a specified length or less.

When a case in which a carbon nanotube is fastened to the protruding portion of a cantilever is considered, this fastening work is performed while viewing an enlarged image of the object under an electron microscope. If there is variation in the length of the carbon nanotube, it might be thought that it is sufficient to fasten the nanotube to the protruding portion by means of a coating film or thermal fusion after adjusting the length of the base end portion so that the length of the tip end portion is fixed.

However, fastening the carbon nanotube in place is performed under an electron microscope. Thus, the visual field is narrow, and it is often difficult to observe the base end portion of the carbon nanotube on the protruding portion of the cantilever. As a result, it has been almost impossible in the conventional nanotube probe manufacturing methods to eliminate variations in the length of the tip end portion of the carbon nanotubes. When the carbon nanotube is grown in a vapor phase on the protruding portion of the cantilever, the length is regulated by controlling the growth of nanotubes; accordingly, there is additional difficulty in such a length control.

The above-described drawbacks are also encountered in nanotubes other than carbon nanotubes, e.g., BN type nanotubes (boron-nitrogen type nanotubes) and BCN type nanotubes (boron-carbon-nitrogen type nanotubes). Furthermore, the drawbacks described above are not limited to AFM nanotube probes in which a nanotube is fastened to the protruding portion of a cantilever. Such drawbacks are also widely encountered in cases where nanotubes are fastened to the holders of devices that use nanotubes.

SUMMARY OF THE INVENTION

Accordingly, the object of the present invention is to provide a nanotube length control method which makes it possible to adjust the length of the tip end portion of a nanotube protruding from a holder to a desired length by cutting down the tip end portion of the nanotube.

The present invention is a nanotube length control method characterized in that:

a discharge needle and a nanotube that has a tip end portion which is protruded are set so that a tip end of the discharge needle is disposed to face a tip end of the nanotube, a voltage is applied across the nanotube and the discharge needle, thus causing a discharge to occur between the tip end of the nanotube and the tip end of the discharge needle, and cutting down the tip end of the nanotube by the discharge, thus controlling a length of the nanotube.

In the above method, the voltage is a direct-current voltage or a pulse voltage.

Also, the discharge needle is fastened to a metal plate so that the tip end thereof is protruded, the base end portion of the nanotube is fastened to a holder, and the voltage is applied across this metal plate and the holder.

Furthermore, the discharge needle is made of a nanotube.

DETAILED DESCRIPTION OF THE INVENTION

Embodiments of the length control method for a nanotube, which is used as a probe, of the present invention will be described below in detail with reference to the drawings.

Figure 1:
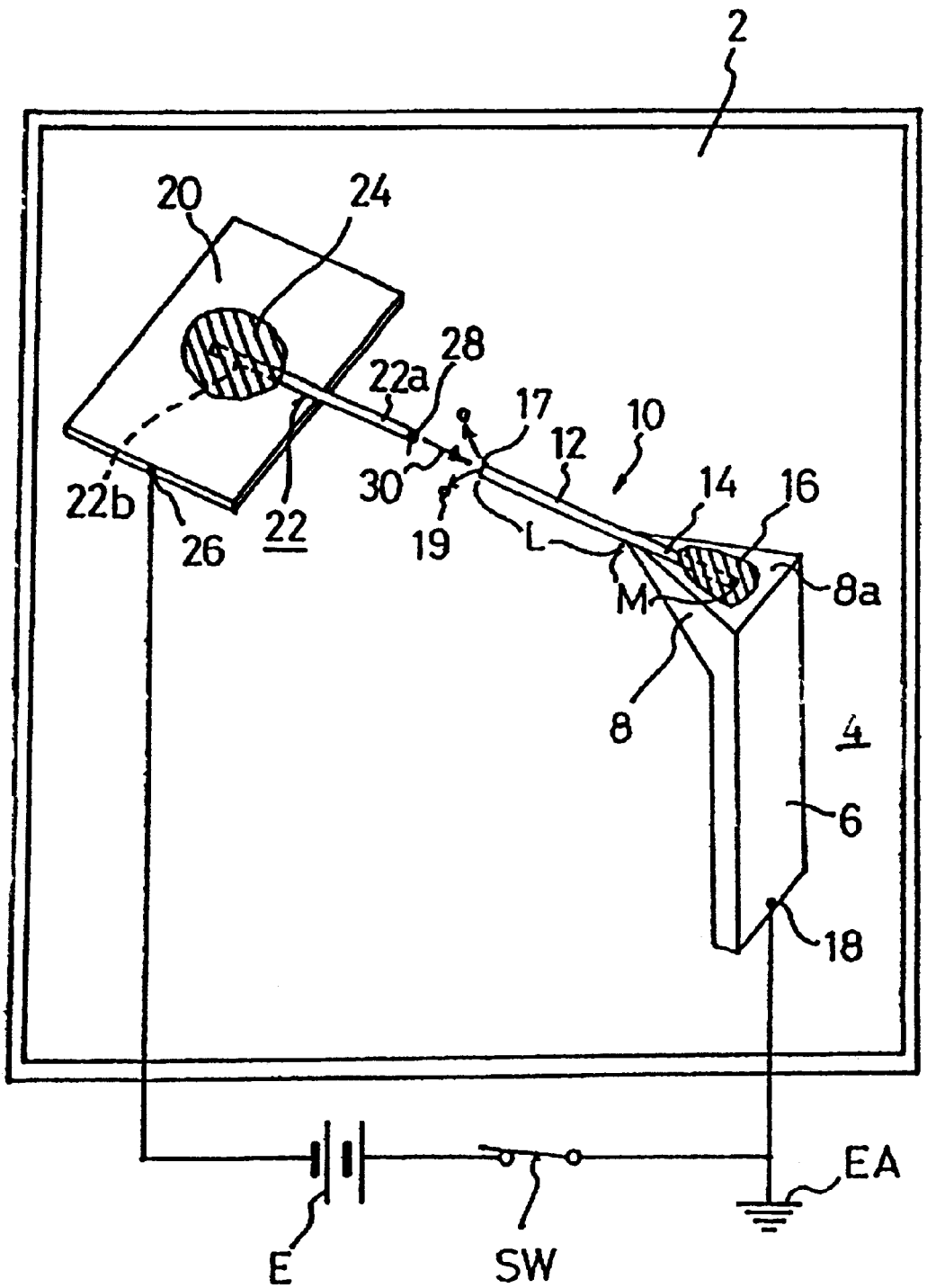
FIG. 1 is a schematic structural diagram of the first embodiment of the nanotube length control method of the present invention.

FIG. 1 is a schematic structural diagram of a first embodiment of the nanotube length control method of the present invention. The present invention is applicable generally to all devices that use nanotubes; however, a case in which a nanotube is fastened to a cantilever and used as a probe needle will be described below as one concrete example.

A nanotube probe 4 comprised of a cantilever portion 6 and a protruding portion 8 is disposed inside an electron microscope chamber 2 that has been evacuated to a vacuum. A nanotube 10 is, at its base end portion 14, firmly fastened to the main surface 8a of the protruding portion 8 by a coating film 16. Thus, the tip end portion 12 of the nanotube 10 protrudes forward, and the tip end 17 of this tip end portion 12 acts as a probe needle point that operates on the surfaces of substances.

The length of the base end portion 14 of the nanotube 10 is set for M, and the length of the tip end portion 12 is set for L. In order to insure uniform performance of the nanotube probe 4, it is necessary that the length L of the tip end portion 12 that acts as a probe needle be the same in each probe. The cross-sectional diameter of the nanotube 10 is not discussed here.

The total lengths of nanotubes 10 manufactured by various manufacturing processes will vary. It is thus difficult to set the length L of the tip end portion at the same value in every probe at the stage in which the base end portion 14 of the nanotube 10 is fastened in place by coating film 16. Accordingly, in the present invention, the length L of the tip end portion is controlled to the same value in all cases by way of cutting down the length L of the tip end portion after the base end portion 14 has been film-fastened to the protruding portion 8. Besides film fastening as described above, cases of fastening by thermal fusion, CVD growth, etc. are also included in the present invention.

Meanwhile, a discharge needle 22 is fastened to an electrode 20 which is a metal plate. The base end portion 22b of the discharge needle 22 is fastened to the electrode 20 by a coating film 24, and the tip end portion 22a of the discharge needle 22 is caused to protrude forward. The discharge needle 22 may be of any material that will discharge with the nanotube 10. For instance, a metal needle with a sharp tip, a nanotube, etc. can be used.

The cantilever portion 6 of the nanotube probe 4 is connected to a ground EA via a terminal 18. The electrode 20 is connected to the negative electrode of a direct-current power supply E via a terminal 26, and the positive electrode of the direct-current power supply E is connected to the ground EA via a switch SW. Accordingly, the discharge needle 22 acts as a negative electrode, and the nanotube 10 is set as a positive electrode.

When the switch SW is turned on, a direct-current voltage is applied across the tip end 28 of the discharge needle 22 and the tip end 17 of the nanotube 10; as a result, a discharge begins between such two tip ends. It is clear that the discharge initiation voltage depends on the distance (gap) between the tip end 28 and the tip end 17 and on the degree of sharpness of the tip ends 28 and 17.

In the shown embodiment, when the applied voltage is fixed at 15 (V), and the above-described gap is gradually reduced, then the electrical discharge is initiated. If the applied voltage is further increased, the gap at which the discharge is initiated increases to some extent. If the gap is set at a constant size, the discharge current increases with an increase in the applied voltage. Thus, in a case where the sharpness of the tips and the applied voltage are given, then a desired discharge is initiated by reducing the gap until a discharge occurs. Accordingly, in some cases the discharge occurs at 15 V, and in some other cases the discharge occurs at 150 V.

Electrons fly continuously toward the tip end 17 of the nanotube 10 from the tip end 28 of the discharge needle 22. Thus, the tip end 17 is melted by the electron bombardment (discharge) 30 and heat, and fragments 19 are scattered. As a result, the length L of the tip end portion of the nanotube 10 gradually shortens.

The electronic discharge is performed while being observed with an electron microscope. When the switch SW is turned off at a point where the length L of the tip end portion reaches a predetermined length, the discharge stops. By such a discharge, the lengths L of the tip end portions of respective probes are controlled to the same length, and uniform performance of the nanotube probes 4 is thus assured.

Figure 2:
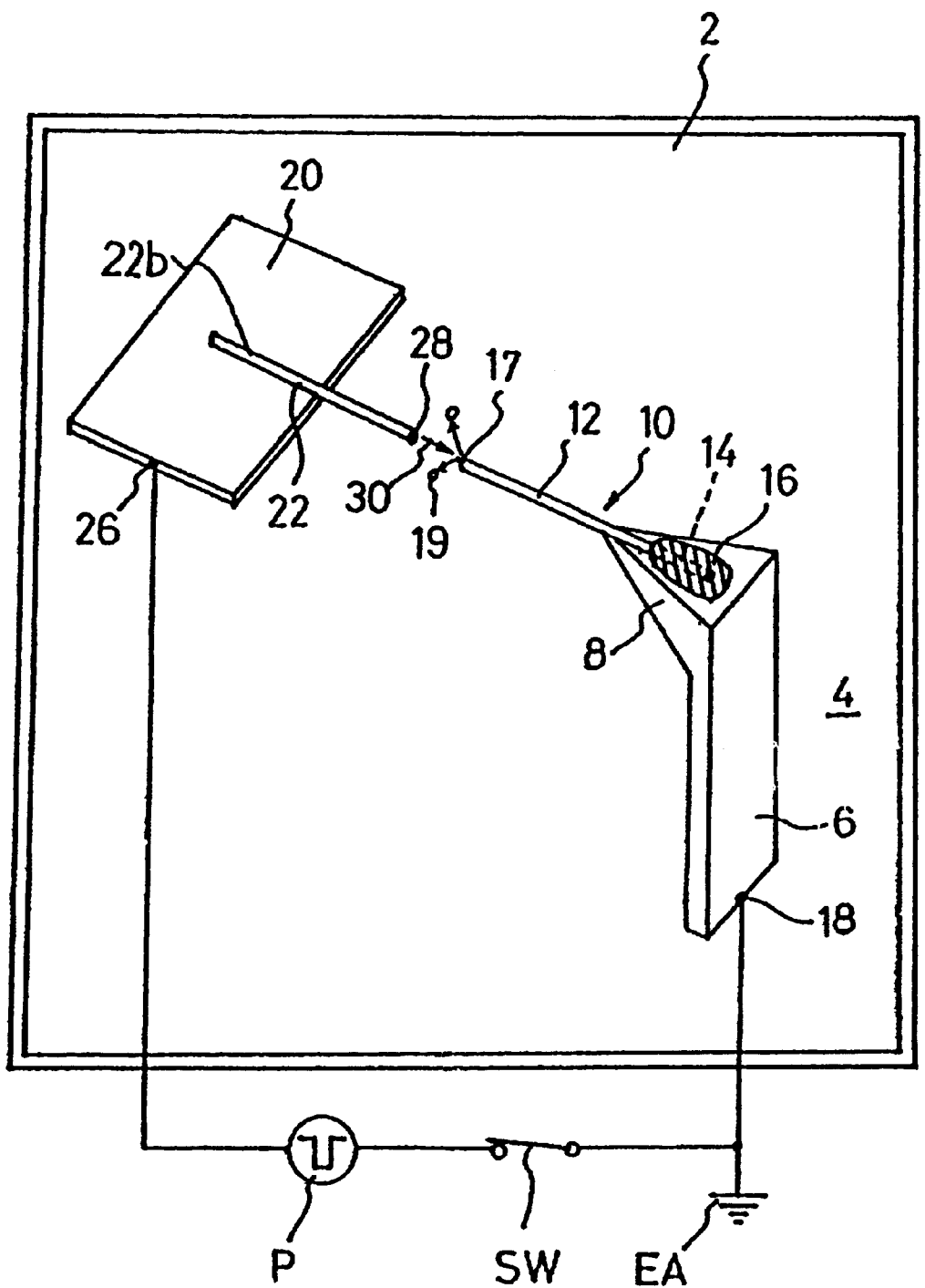
FIG. 2 is a schematic structural diagram of the second embodiment of the nanotube length control method of the present invention.

FIG. 2 is a schematic structural diagram of the second embodiment of the nanotube length control method of the present invention. The second embodiment differs from the first embodiment in that the base end portion 22b of the discharge needle 22 is not fastened by a coating film and in that a pulse power supply is used as the power supply. The other components are exactly the same as those of FIG. 1, and a description of the components labeled with the same reference numerals is omitted.

The discharge needle 22 is merely in contact with the electrode 20; however, van der Waals force is acting between these two elements, as a result the discharge needle 22 is believed to be fastened to the electrode 20 even though no coating film is used for fastening. Accordingly, the discharge is not impeded even in the absence of a coating film.

Furthermore, in the second embodiment, a pulse power supply P is used instead of the direct-current power supply E. The discharge needle 22 is designed so as to act as a negative electrode while the pulse voltage is being applied. In other words, the discharge needle 22 acts as an electron source, and the nanotube 10 is subjected to electron bombardment.

The rate at which the tip end 17 of the nanotube 10 is shortened depends on the size of the gap and the magnitude and pulse frequency of the pulse voltage. The rate at which the tip end 17 is shortened increases with a decrease in the gap and an increase in the pulse voltage and pulse frequency.

The present invention is not limited to the above-described embodiments. It goes without saying that various modifications, design alterations, etc. that involve no departure from the technical concept of the present invention are included in the technical scope of the present invention.

According to the present invention, the discharge needle and the nanotube are set so as to face each other and then a voltage is applied across the tip ends of such two elements; as a result, an electrical discharge is caused to occur between the tip end of the discharge needle and the tip end of the nanotube merely. As a result, the tip end of the nanotube is cut down by this electrical discharge, and the length of the tip end portion of the nanotube can thus be controlled and shortened. Accordingly, a uniform performance in the devices that use nanotubes is assured.

In addition, the applied voltage is set as a direct-current voltage. As a result, the discharge current is constant, and the rate at which the tip end of the probe nanotube is shortened is maintained at a constant value. Accordingly, it is only necessary to control the discharge time in order to achieve a desired shortening of the tip end portion of the nanotube. When a pulse voltage is used, the shortening rate of the tip end portion can be varied by way of adjusting the pulse frequency. Thus, the cutting can be freely controlled from ultra-low-speed cutting to high-speed cutting.

Also, the discharge needle is fastened to a metal plate, and the nanotube is fastened to a holder. Accordingly, it is only necessary to apply a voltage across this metal plate and the holder, and the disposition and design of the used members inside the vacuum apparatus can be accomplished relatively easily.

Furthermore, a nanotube is used as the discharge needle. As a result, since the tip end of the discharge needle is extremely sharp, the discharge current is high; and it becomes possible to increase the working rate at which the nanotube is shortened.

What is claimed is:

1. A nanotube length control method comprising the steps of:

setting a discharge needle and a nanotube, which has a tip end portion that is protruded, so that a tip end of said discharge needle is disposed to face said tip end of said nanotube, applying a voltage across said nanotube and said discharge needle, thus causing an electrical discharge to occur between said tip end of said nanotube and said tip end of said discharge needle, and cutting down said tip end of said nanotube by said discharge, thus controlling a length of said nanotube.

2. The nanotube length control method according to claim 1, wherein said voltage is a direct-current voltage or a pulse voltage.

3. The nanotube length control method according to claim 1, wherein said discharge needle is fastened to a metal plate with said tip end of said discharge needle protruded, a base end portion of said nanotube is fastened to a holder, and said voltage is applied across said metal plate and said holder.

4. The nanotube length control method according to claim 1, 2 or 3, wherein said discharge needle is a nanotube.

* * * * *